US006093978A

United States Patent [19]

Benard et al.

[11] Patent Number: 6,093,978

[45] Date of Patent: Jul. 25, 2000

[54] SECURITY SYSTEM FOR A MOTOR VEHICLE OPENING LEAF COMPRISING IMPROVED CONNECTION MEANS

[75] Inventors: Thierry Benard, Paris, France; Luc Josserand, Turin, Italy

[73] Assignee: Valeo Securite Habitacle, Creteil Cedex, France

[21] Appl. No.: 09/354,226

[22] Filed: Jul. 15, 1999

[30] Foreign Application Priority Data

Jul. 17, 1998 [FR] France .................................. 98 09190

[51] Int. Cl.[7] .................................................... B60R 25/00

[52] U.S. Cl. .................. 307/10.2; 307/10.1; 340/825.31

[58] Field of Search ................................ 307/10.1, 10.2, 307/10.3; 340/426, 825.31; 250/221

[56] References Cited

U.S. PATENT DOCUMENTS

| | | | |
|---|---|---|---|
| 5,225,827 | 7/1993 | Persson | 340/904 |
| 5,366,389 | 11/1994 | Kreutter | 439/571 |
| 5,594,238 | 1/1997 | Endruschat et al. | 250/221 |
| 5,682,135 | 10/1997 | Labonde | 340/426 |
| 5,729,057 | 3/1998 | Frenzel et al. | 307/10.3 |
| 5,929,769 | 7/1999 | Garnault | 340/825.31 |

FOREIGN PATENT DOCUMENTS

| | | |
|---|---|---|
| 81 33 571 | 5/1982 | Germany . |
| 42 12 291 | 10/1993 | Germany . |
| 43 31 280 | 9/1994 | Germany . |

OTHER PUBLICATIONS

French Search Report dated Mar. 3, 1999 FA559717/FR980190.

*Primary Examiner*—Stephen W. Jackson
*Assistant Examiner*—Sharon Polk
*Attorney, Agent, or Firm*—Morgan & Finnegan, LLP

[57] ABSTRACT

The invention relates to a security system for a motor vehicle opening leaf, comprising at lest one sensor capable of emitting or of receiving an electromagnetic signal so as to detect, remotely, the presence of a user's hand, wherein the hand-detecting means comprise an internal module which contains the control circuit and which is arranged on the inside of the bodywork panel, and an external module comprising at least one casing which bears the sensor, and the external and internal modules comprise means of connecting the sensor to the control circuit, which automatically come into contact with one another when the two modules are mounted on the opening leaf.

12 Claims, 2 Drawing Sheets

SECURITY SYSTEM FOR A MOTOR VEHICLE OPENING LEAF COMPRISING IMPROVED CONNECTION MEANS

BACKGROUND OF THE INVENTION

The invention relates to a security system for a motor vehicle opening leaf.

The invention relates more specifically to a security system for an opening leaf of a motor vehicle of the type in which the opening leaf is held in the closed position by a lock which is operated by means of a handle arranged on the outside of a bodywork panel of the opening leaf, of the type in which the security system comprises means for detecting, remotely, by means of an electromagnetic signal, the presence of a user's hand near the handle, and of the type in which the detection means comprise a control circuit and at least one sensor capable of emitting or of receiving the electromagnetic signal.

Such a system is described, for example, in document FR-A-2,733,783. The system described in this document proposes the use, as a means of detecting the presence of the hand, of an infrared-radiation sensor. This sensor "observes" an area in space around the handle so that when a user's hand approaches it, the infrared radiation emitted by the hand is picked up and analyzed by the sensor which is then capable of transmitting control information to an antitheft unit.

However, the invention can also be implemented in the context of a security system in which the detection means comprise an emitter which emits an electromagnetic signal intended to be received by a receiver, the path of the signal between the emitter and the receiver running, at least in part, on the outside of an external panel of the opening leaf. In this case, the presence of the hand is detected when the hand intercepts the path of the signal because, at that instant, the signal is no longer received by the receiver.

In this case, the signal may, for example, be infrared radiation.

In such a system, it is therefore necessary for the sensor or sensors to be able to "see" the environment on the outside of the handle. However, there is good cause to ensure that the detection means circuit should itself be arranged on the inside of the bodywork panel of the opening leaf, for obvious esthetic reasons.

BRIEF SUMMARY OF THE INVENTION

The object of the invention is to propose a special design of security system which is particularly simple to mount on the vehicle, while at the same time guaranteeing correct positioning of, on the one hand, the sensors with respect to the opening leaf and, on the other hand, the sensors with respect to the control circuit. Furthermore, the closure system according to the invention must display every guarantee of imperviousness to prevent moisture or dust from disrupting the operation of the sensor or sensors and of the electronic control circuit.

To this end, the invention proposes a security system for an opening leaf of a motor vehicle of the type in which the opening leaf is held in the closed position by a lock which is operated by means of a handle arranged on the outside of a bodywork panel of the opening leaf, of the type in which the security system comprises means for detecting, remotely, by means of an electromagnetic signal, the presence of a user's hand near the handle, and of the type in which the detection means comprise a control circuit and at least one sensor capable of emitting or of receiving the electromagnetic signal wherein the hand-detecting means comprise an internal module which contains the control circuit and which is arranged on the inside of the bodywork panel, and an external module comprising at least one casing which extends axially through an opening made in the bodywork panel and bears the sensor, the external module is mounted axially from the outside inward through the opening, and the external and internal modules comprise additional means of electrical connection which allow the sensor to be electrically connected to the control circuit and which automatically come into contact with one another when the two modules are mounted on the opening leaf.

According to other features of the invention:

- the additional means of connection comprise at least one elastically deformable element;
- one of the modules comprises at least one axially deformable contact which is intended to come into contact with a corresponding block borne by the other of the modules;
- one of the modules comprises at least one blade which extends axially, which is deformable in a transverse direction so as to come to bear transversely against an axial wiper track borne by the other module;
- the casing of the external module comprises an external transverse wall which is transparent to the electromagnetic signal, and a tubular skirt which extends axially inward from the external wall to delimit a housing in which the sensor is arranged, and the means of connecting the external module are arranged at the internal transverse end of the tubular skirt;
- the housing delimited by the tubular skirt is open at its internal axial end;
- the internal module comprises a case in which the control circuit is arranged, and the tubular skirt of the external module is guided through an orifice in an external transverse wall of the case;
- the orifice in the case is delimited by a tubular element, and there is a radial seal between the tubular element of the case and the tubular skirt of the external module;
- the external module is secured axially by elastic push-fitting means which cooperate with the bodywork panel;
- the system comprises two sensors which are borne by the external module, and the external and internal modules comprise additional means of electrical connection which allow the two sensors to be electrically connected to the control circuit and which automatically come into contact with one another when the two modules are mounted on the opening leaf;
- the two sensors are respectively an emitter and a receiver of the electromagnetic signal.

Other features and advantages of the invention will become clear from reading the detailed description which follows, for an understanding of which reference will be made to the appended drawings, in which:

DETAILED DESCRIPTION OF THE INVENTION

Figure 1:
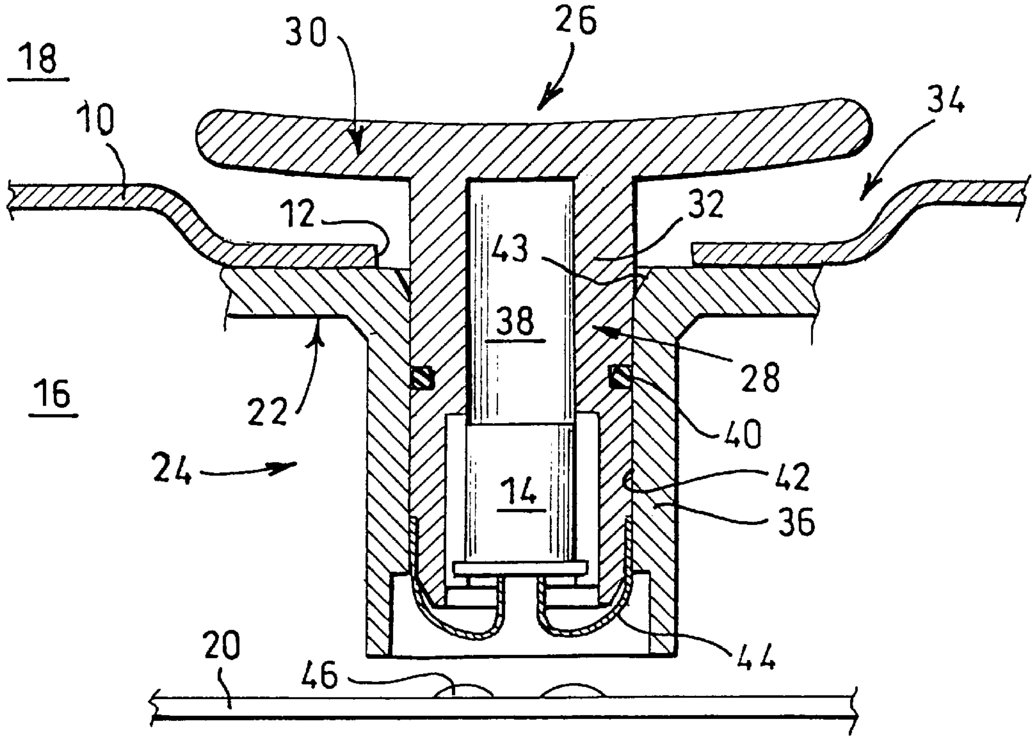
FIGS. 1 and 2 are diagrammatic views in section on an axial plane perpendicular to a general plane of a motor vehicle opening leaf illustrating, during mounting and in the mounted position, respectively, a security system in accordance with the teachings of the invention.

The figures illustrate an external bodywork panel 10 of a motor vehicle opening leaf. In one portion of this panel 10, for example near to a handle (not depicted) which is intended to operate a lock mechanism to allow the opening leaf to be opened, there is an opening 12 which is intended to allow a sensor 14, arranged on the inside 16 of the panel 10, to be able to emit and/or receive an electromagnetic signal toward and from the outside 18 of the bodywork panel.

The sensor 14 forms part of an opening leaf security system and is intended to allow the approach of a user's hand to be detected so as, for example, to trigger a procedure for identifying this user, preferably by remote transmission of encoded data between an antitheft unit contained in the vehicle and an identity badge worn by the user.

This identification sequence, if it ascertains the presence of an authorized user, must allow the antitheft unit to trigger an action of unlocking the lock. The security system according to the invention comprises an electronic control circuit which is, for example, borne by a printed-circuit board 20 arranged inside a case 22 which is mounted on the opening leaf on the inside 16 of the bodywork panel 10.

According to the invention, the sensor 14 is designed to be mounted, not directly on an internal module 24 of the detection means, which in particular consists of the case 22 and of the printed-circuit board 20, but on an external module 26 which is intended to be mounted from the outside through the opening 12 in the bodywork panel 10.

In the embodiment illustrated in the figures, the external module 26 comprises a casing 28 which comprises an external transverse wall 30 and a tubular cylindrical skirt 32 which extends transversely inward from the external transverse wall 30, through the opening 12.

The external transverse wall 30 is intended to come up against an external face of the bodywork panel 10, so as to conceal the opening 12 therein. The external transverse wall 30 may, as is depicted in the figures, be housed inside a depression 34 in the bodywork panel 10. Of course, the external transverse wall 30 is made of a material which is transparent to the electromagnetic signal used by the sensor 14. In this particular instance, the entire casing 28 is molded as a single piece, from one material.

In the embodiments illustrated in the figures, the cylindrical tubular skirt 32 of the casing 28 is fitted by sliding in its axial direction into a tubular element 36 of the case 22, of complementing cross section, so as to be guided in the axial direction as it is inserted from the outside inward. The axial tubular skirt 32 is open at its internal axial end and delimits a housing 38 inside which is arranged the sensor 14 which is secured thereto in a way which has not been depicted.

The tubular skirt 32 comprises, in its external cylindrical face, a radial groove in which an O-ring seal 40 is housed, this seal cooperating with an internal cylindrical face 42 of the tubular element 36 to prevent the possibility of the ingress of dust or moisture into the case 22 from the outside.

Of course, the tubular element 36 opens axially to the outside through an orifice 23 which is arranged facing the opening 12 in the bodywork panel 10.

In accordance with the teachings of the invention, the internal 24 and external 26 modules of the detection means comprise additional means of electrical connection which allow the sensor 14 to be electrically connected to its control circuit borne by the printed-circuit board 20, these connection means automatically coming into contact with one another when the two modules 24, 26 are mounted on the opening leaf.

Three alternative embodiments will be described below.

Figure 2:
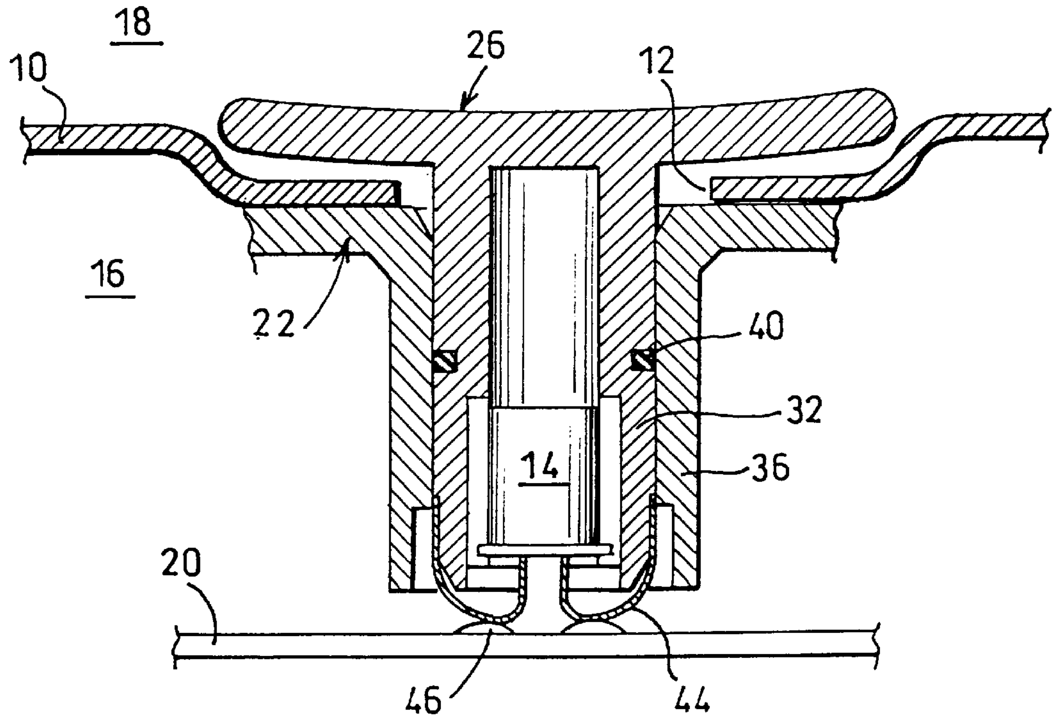

In a first embodiment of the invention, illustrated in FIGS. 1 and 2, the external Module 26 comprises two contacts 44 which are axially deformable and which are intended to come into contact against corresponding blocks 46 borne by the printed-circuit board. The contacts 44 are each formed of an elastic and conducting tab which is bent more or less into a U-shape in the axial direction, each contact 44 being connected to an electric terminal (not depicted) of the sensor 14. Of course, the contacts 44 protrude axially toward the inside beyond the internal axial end of the tubular skirt 32 of the casing 28.

The contacts 44 thus have two lateral axial parts which are joined at their interior end by a domed part, the concave side of which faces outward. Thus, the domed part of the contacts 44 is intended to come into contact, via a convex external surface which faces inward, against a convex external surface of the contact blocks 46, the latter surface itself facing outward.

Thus, the security system is mounted on the vehicle by first of all securing the case 22, which bears the printed-circuit board 20, on the inside of the bodywork panel 10, then by introducing the external module 26 axially inward through the opening 12 until, depicted in FIG. 2, the contacts 44 come into contact with the blocks 46.

The ability of the contacts 44 to deform makes it possible to compensate for uncertainties regarding the relative positioning of the various parts with respect to each other in the axial direction. This is of particular benefit when the external module 26 is secured by elastic push-fit systems which cooperate with the bodywork panel 10, for example with the edge of the opening 12 therein.

Figure 3:
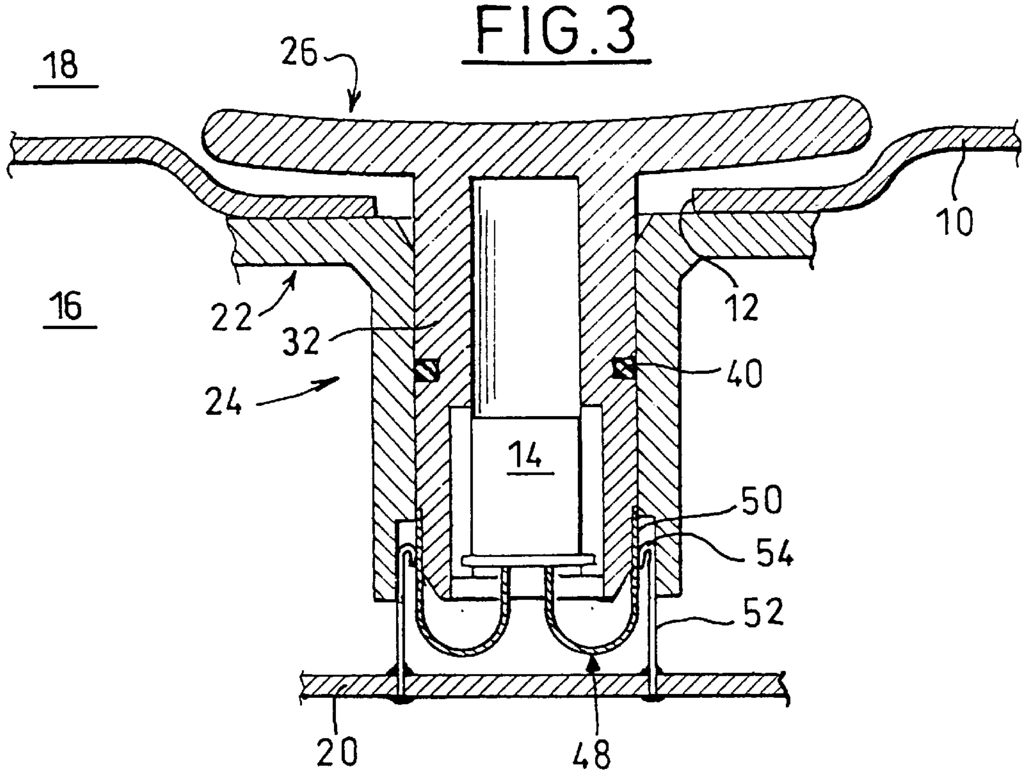
FIGS. 3 and 4 are views similar to that of FIG. 2, and respectively illustrate a second and a third embodiment of the invention.

In the second embodiment of the invention, which is illustrated in FIG. 3, it may be seen that the external module 26 comprises contacts 48 which are similar to those of the first embodiment.

However, these contacts 48, which are not necessarily elastically deformable, in this case each comprise an external lateral part 50 which forms a wiper track directed axially. The printed-circuit board 20 carries two blades 52 which extend axially outward and which are elastically deformable in a transverse direction perpendicular to the axial direction in which the external module 26 is engaged through the opening 12. The free axial end 54 of each of the blades 52 is curved axially inward, in the shape of an inverted U, and can come to bear elastically in a transverse direction against the wiper track 50 of the corresponding contact 48. The length of this wiper track 50 again makes it possible to compensate for differences in the relative axial positioning of the various parts.

Figure 4:
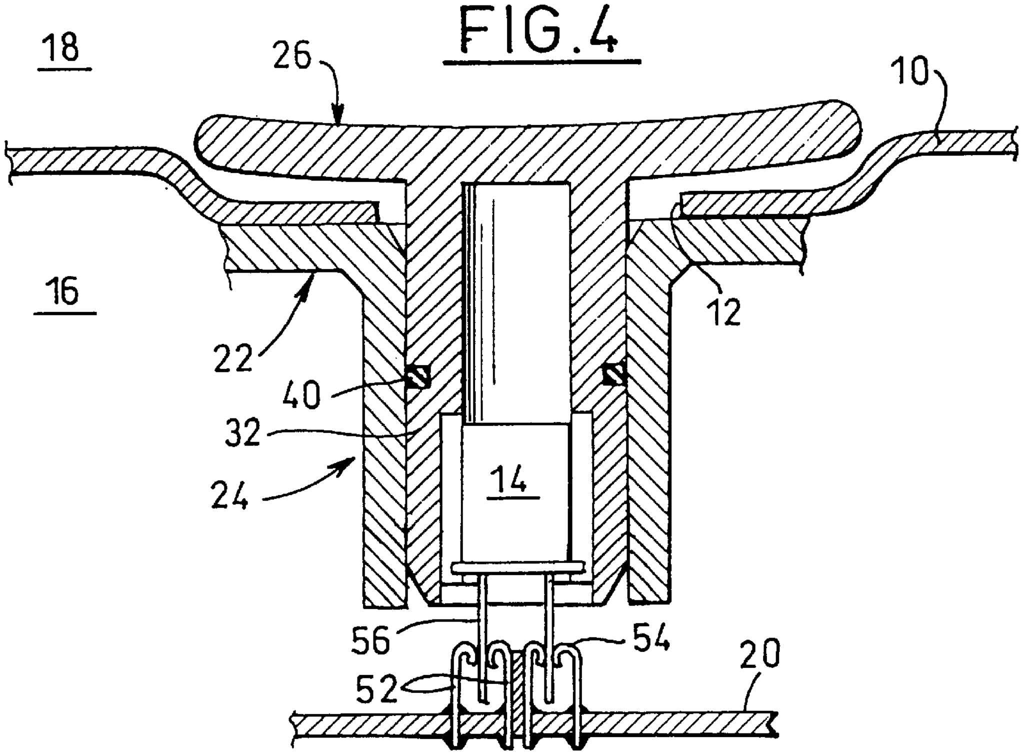

In the third embodiment of the invention, illustrated in FIG. 4, the external module 26 comprises two pins 56 which extend axially inward beyond the internal axial end of the tubular skirt 32. These pins 56 could possibly be connecting pins of the sensor 14. In this embodiment, the means of connecting the internal module 24 consist of two pairs of elastic blades 52 substantially identical to those described in conjunction with the second embodiment of FIG. 3. pair therefore comprises two blades, the free ends 54 of which tend to press transversely toward one another. The corresponding pin 56 of the external module 26 is intended to be inserted between the bent-over free ends 54 of the pair of blades 52, moving at least one of these ends 54 transversely aside so that this end remains pressed elastically against this pin 56.

Of course, the invention is not restricted to the three embodiments which have just been described, the person skilled in the art being capable, by virtue of the teaching of the invention, of finding other embodiments of the means of electrical connection which allow automatic connection of the sensor 14 to its control circuit when the module 26 is fitted on the opening leaf.

Likewise, the embodiments illustrated show the presence of just one sensor 14. However, it has been seen that certain detection systems call upon two sensors—an emitter and a receiver. In this case, depending on the location of the two sensors, and in particular depending on their separation, it would be possible to envisage for the two sensors to be borne by two separate external modules or, on the other hand, by a single external module which, in this case, would comprise automatic connection means for both sensors.

What is claimed is:

1. A security system for an opening leaf of a motor vehicle of the type in which the opening leaf is held in closed position by a lock which is operated by means of a handle arranged on the outside of a bodywork panel of the opening leaf, of the type in which the security system comprises means for detecting, remotely, by means of an electromagnetic signal, the presence of a user's hand near the handle, and of the type in which the detection means comprise a control circuit and at least one sensor capable of emitting or of receiving the electromagnetic signal wherein the hand-detecting means comprise an internal module which contains the control circuit and is arranged on the inside of the bodywork panel, and an external module comprising at least one casing which extends axially through an opening made in the bodywork panel and bears the sensor, the external module is mounted axially from the outside inward through the opening, and the external and internal modules comprise additional means of electrical connection which allow the sensor to be electrically connected to the control circuit and which automatically come into contact with one another when the two modules are mounted on the opening leaf.

2. A security system as claimed in claim 1, wherein the additional means of connection comprise at least one elastically deformable element.

3. A security system as claimed in claim 2, wherein one of the modules comprises at least one axially deformable contact which is intended to come into contact with a corresponding block borne by the other of the modules.

4. A security system as claimed in claim 2, wherein one of the modules comprises at least one blade which extends axially, which is deformable in a transverse direction so as to come to bear transversely against an axial wiper track borne by the other module.

5. A security system as claimed in claim 1, wherein the casing of the external module comprises an external transverse wall which is transparent to the electromagnetic signal, and a tubular skirt which extends axially inward from the external wall to delimit a housing in which the sensor is arranged, and the means of connecting the external module are arranged at the internal transverse end of the tubular skirt.

6. A security system as claimed in claim 5, wherein the housing delimited by the tubular skirt is open at its internal axial end.

7. A security system as claimed in claim 5, wherein the internal module comprises a case in which the control circuit is arranged, and the tubular skirt of the external module is guided through an orifice in an external transverse wall of the case.

8. A security system as claimed in claim 7, wherein the orifice in the case is delimited by a tubular element, and there is a radial seal between the tubular element of the case and the tubular skirt of the external module.

9. A security system as claimed in claim 5, wherein the external module is secured axially by elastic push-fitting means which cooperate with the bodywork panel.

10. A security system as claimed in claim 5, which comprises two sensors which are borne by the external module, and wherein the external and internal modules comprise additional means of electrical connection which allow the two sensors to be electrically connected to the control circuit and which automatically come into contact with one another when the two modules are mounted on the opening leaf.

11. A security system as claimed in claim 10, wherein the two sensors are respectively an emitter and a receiver of the electromagnetic signal.

12. A security system as claimed in claim 6, wherein the internal module comprises a case in which the control circuit is arranged, and the tubular skirt of the external module is guided through an orifice in an external transverse wall of the case.

* * * * *